(12) United States Patent
Kimura

(10) Patent No.: US 6,922,157 B2
(45) Date of Patent: Jul. 26, 2005

(54) ELECTRONIC DEVICE AND PROGRAM

(75) Inventor: Masahiro Kimura, Kariya (JP)

(73) Assignee: Denso Corporation, Kariya (JP)

(*) Notice: Subject to any disclaimer, the term of this patent is extended or adjusted under 35 U.S.C. 154(b) by 67 days.

(21) Appl. No.: 10/716,607

(22) Filed: Nov. 20, 2003

(65) Prior Publication Data
US 2004/0125989 A1 Jul. 1, 2004

(30) Foreign Application Priority Data
Dec. 19, 2002 (JP) .................. 2002-368442

(51) Int. Cl.$^7$ .................................. G08G 1/123
(52) U.S. Cl. .................. 340/995.14; 340/995.15; 340/990; 701/210; 701/212; 382/113
(58) Field of Search .............. 340/995.14, 995.15, 340/990, 995.17, 995.18, 995.12, 995.1, 995.28, 995.25, 995.24, 995.27; 701/212, 210, 208, 213, 200, 28, 201, 202; 382/113

(56) References Cited

U.S. PATENT DOCUMENTS 5,948,042 A * 9/1999 Heimann et al. .......... 701/208
6,075,467 A * 6/2000 Ninagawa ............... 340/995.14
6,230,098 B1 * 5/2001 Ando et al. ............... 701/208
6,704,649 B2 * 3/2004 Miyahara .................. 701/208

FOREIGN PATENT DOCUMENTS

| JP | A-H06-60177 | 3/1994 |
| JP | A-H09-145383 | 6/1997 |
| JP | A-H11-174953 | 7/1999 |
| JP | A-2001-67458 | 3/2001 |
| JP | A-2001-109372 | 4/2001 |
| JP | A-2001-109373 | 4/2001 |
| JP | A-2002-279437 | 9/2002 |

* cited by examiner

Primary Examiner—Anh V. La
(74) Attorney, Agent, or Firm—Posz Law Group, PLC (57) ABSTRACT

An electronic device detects a discontinuous figure in an old-new connection portion between old and new data and performs shape correction so as to restore the continuous figure. In this case, only the old data is corrected. Particular shape correction methods are as follows: (a) only the old-data side shape point P1 in the old-new connection portion is moved to match the new-data side shape point SP1; (b) other shape points P2 to P5 are moved in parallel by the same amount as that of movement of the shape point P1 in the old-new connection portion; and (c) among the old-data side shape points P1 to P5, the farthest shape point P5 from the shape point P1 in the old-new connection portion is not moved as a reference, and the other shape points P1 to P4 are moved in accordance with distance from the farthest shape point P5.

10 Claims, 3 Drawing Sheets

FIG. 3C $$d2 = \frac{L2+L3+L4}{L1+L2+L3+L4} \times d1$$

$$d3 = \frac{L3+L4}{L1+L2+L3+L4} \times d1$$

$$d4 = \frac{L4}{L1+L2+L3+L4} \times d1$$

FIG. 4A

CONNECTION

FIG. 4B

CONNECTION

FIG. 4C

CONNECTION

FIG. 4D

CONNECTION

FIG. 4E

CONNECTION

FIG. 4F

CONNECTION

FIG. 4G

CONNECTION

ELECTRONIC DEVICE AND PROGRAM

CROSS REFERENCE TO RELATED APPLICATIONS

This application is based on and incorporates herein by reference Japanese Patent Application No. 2002-368442 filed on Dec. 19, 2002.

FIELD OF THE INVENTION

The present invention relates to a technique to solve a problem which occurs when map data used in, e.g., map display, is partially updated.

BACKGROUND OF THE INVENTION

As an electronic device which executes given processing using map data, an in-vehicle navigation device is known. In the in-vehicle navigation device, map data necessary for realizing various functions such as map display and route calculation is read from a storage medium such as a CD-ROM or a DVD-ROM (hereinbelow, also abbreviated to "CD/DVD").

The map data in the CD/DVD supplied to the above in-vehicle navigation device becomes old with the passage of time due to opening of a new road, changes of road shape and traffic regulations, new construction/closure of various facilities and the like. For this reason, the contents of the CD/DVD are updated periodically (for example, once every year) and put on sale. As the procedure, first, map data as original data of the map data to be stored on the CD/DVD (hereinbelow, referred to as "map original data") is newly generated. Then, after the latest map data has been generated, the map original data is edited with the latest map data, then a new version CD/DVD is generated and put on sale. Note that the editing of the map original data and the generation of CD/DVD mean editing the map original data and writing the edited map data on a blank CD/DVD.

In the conventional in-vehicle navigation device, a user must buy a new version CD/DVD to always obtain latest information.

On the other hand, a map data update system (hereinbelow, referred to as a "difference update system") is proposed. In this system, difference information (i.e., information on additional/deleted/changed data) between old map data in a CD/DVD in an in-vehicle navigation device and new map data is supplied from an external information center by utilizing wireless communications or the like. Then, the map data of the navigation device is updated with the new contents based on the difference information from the center. In a case where this difference update system is put into practical use, the user of in-vehicle navigation device can always obtain road information based on latest information without buying a latest CD/DVD (for example, See Patent Documents 1, 2 and 3).

[Patent Document 1]
JP-A-2001-109372
[Patent Document 2]
JP-A-2001-109373
[Patent Document 3]
JP-A-2001-67458

However, although the concept of the difference update exists, the difference update of map data is not actually put into practical use. Particular problems which occur in practical use of the system have not been sufficiently studied.

Accordingly, the present inventors have studied problems which may occur in a case where the difference update of map data is actually put into practice, and focused attention on the following problem. That is a shift of map data in a connection portion between unupdated map data (old map data) and updated map data (new map data). Seemingly, such shift does not occur between the old and new map data, but it is considered that the shift actually occurs due to the following reasons:

(1) In a case where the position of a road, existing in both the old and new map data, has been changed, a shift occurs when the old and new map data are mixed.

(2) In a case where the position of a road has not been changed but data generating standards in the old and new map data are different, a shift may occur when the old and new map data are mixed. For example, in a case where the accuracy of indication of road position has been improved, a position in the old map data, which was shifted from an actual position, corresponds with or closer to the actual position in the new map data. Further, in a case where the manufacturers of the old and new map data are different, data generating standards may be different.

When such shift occurs, in a connection portion of map data, a road is broken in the middle, thus the initially-continuous road becomes discontinuous. Further, in the case (2), a shift occurs in other map constituent elements as well as roads.

Upon display of map data, where these map constituent elements are shifted in a connection portion between the old and new map, the appearance of the map is very poor. Further, this may cause degradation of map matching accuracy. The map matching is specifying a current position on a road by using current position information detected using a GPS, road shape data of map data and the like. When the above-described shift exists, the road shape supposed to be matched around the map connection portion cannot be specified without difficulty. Further, such degradation of the accuracy of map matching and rapid shape change due to such shift may cause execution of inappropriate right/left turn guidance. In this manner, this problem disturbs execution of appropriate navigation function.

SUMMARY OF THE INVENTION

It is an object of the present invention to appropriately correct a shift of map constituent element between old and new map data in a case where map data is partially updated.

To achieve the above object, an electronic device is provided with the following. Map data is stored with including figure data formed of at least shape point coordinate array data. Given processing is executed based on the map data. Update information supplied is received from an outside. The update information is for updating the stored map data and includes specifying information for specifying updated figure data that is to be updated in the map data and new figure data. The updated figure data is updated with the new figure data. The specifying information and the new figure data are correlated with each other. When the update information is received, the updated figure data is specified from the map data and the specified updated figure data is updated with the new figure data. Here, it is determined whether an initially-continuous figure has a discontinuous portion in a connection portion between the new figure data and an adjacent figure data that is not updated in the map data after updating and is adjacent to the new figure data. When the initially-continuous figure is determined to have the discontinuous portion, at least one of an end shape point of the new figure data and an end shape point of the adjacent figure data is moved so as to bring the two end shape points into correspondence. Each of the two end shape points is included in a plurality of shape points and corresponds to the discontinuous portion. Here, the shape-corrected map data is stored in the storage unit or both of the above determining and moving are executed when the map data is read from the storage unit in accordance with executing the given processing.

In this structure, in a case where a discontinuous portion or a shift is detected between end shape points in a connection portion after being partially updated, the shift can be solved. When the corrected map is used for the given processing, e.g., such as map display, map matching, or route guidance, this can restrict degradation of appearance in the map display, degradation of accuracy in the map matching, and further, inappropriate guidance in right/left turn guidance.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinbelow, a map data update system according to an embodiment to which the present invention is directed will be described with reference to the drawings.

[System Configuration]

Figure 1:
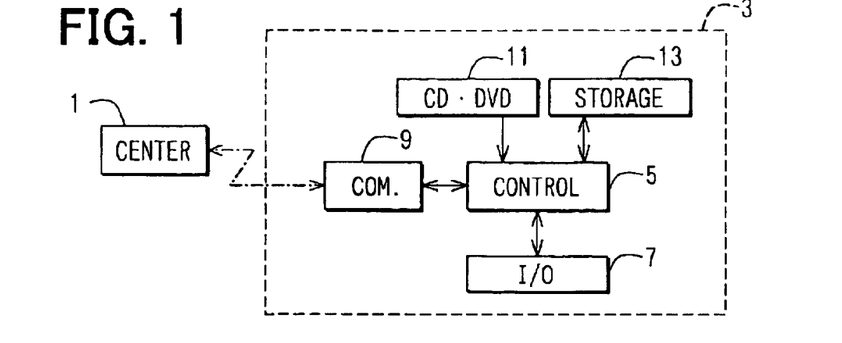
FIG. 1 is a block diagram showing a map data update system according to an embodiment of the present invention.

First, as shown in FIG. 1, the map data update system of the present embodiment has an information center (hereinbelow, simply referred to as a "center") 1 as an external information station on the ground and a navigation device 3 as an in-vehicle electronic device.

Note that the present embodiment will be described about an in-vehicle navigation device, however, the present invention is not limited to this device. For example, the present invention is applicable to various electronic devices (a personal computer, a cellular-phone navigation device, and the like). These devices have functions for execution of various processings using map data such as a map display function of displaying a map on a given display device, a route search function and a route guidance function.

The navigation device 3 has a control unit 5 mainly comprised of a microcomputer, a display (not shown), an input/output unit 7 with various key switches (not shown), a communication unit 9 for wireless communications with the center 1, a CD/DVD 11 holding map data used in map display on the abovementioned display and route calculation by the control unit 5, and a storage medium 13 for storing the map data and the result of calculation by the control unit 5.

Note that the storage medium 13, which can hold stored contents even when power supply to the navigation device 3 is stopped, is an EEPROM, a flash ROM, a hard disk, or the like. In the present embodiment, the CD/DVD 11 and the storage medium 13 correspond to a storage unit for storing map data.

Further, the input/output unit 7 has a position detection unit (not shown). The position detection unit has a well-known gyroscope, a distance sensor, a GPS receiver to detect a vehicle position based on radio waves from satellites, and the like.

Further, the above-described control unit 5 realizes functions of map data acquisition, map matching, route calculation, route guidance, drawing, image control management, and the like. The respective functions will be briefly described.

The map matching function is specifying a current position, i.e., a road on which the vehicle is currently positioned, using current position information detected by the position detection unit, road shape data of map data stored in the storage medium 13 and the like.

Further, the user can input an instruction to, e.g., display a preferred map and further set a target point using the key switches. The route calculation function is calculating a route from the current position information obtained by the map matching or a start point set by the user to the above-mentioned target point. As a method for automatically setting an appropriate route, Dijkstra method is known. The route guidance function is calculating necessary points for route guidance, from the result of the above route calculation, road shape data stored in the map data, position information of intersection and railroad crossing, and the like, and determining necessary guidance (for example, "turn right" or "turn left").

The drawing function is drawing a map of current position, schematic highway map, an enlarged illustration of intersection when the vehicle is near the intersection, or the like, in a drawing memory of VRAM or the like, and displaying the drawn map or the like on the display unit.

The map data acquisition function is acquiring map data necessary for the above respective processings from the storage medium and supplying the data to the respective processing parts. Note that the above respective processings are performed based on the program in the storage medium 13 using the work memory also in the storage medium 13.

In the map data update system of the present embodiment, the map data stored in the storage medium 13 can be partially updated. The outline of the operation related to the update will be described.

[Outline of Map Data Update]

First, the user of the navigation device 3 inputs an instruction to start data update via the key switch or the like of the input/output unit 7. Then the control unit 5 establishes connection with the center 1 via the communication unit 9, reads version information of map data which is currently held/used in the navigation device 3 (when the map data was provided) from the CD/DVD 11 or the storage medium 13, and sends the information via the communication unit 9 to the center 1.

Then the center 1 determines whether or not the map data held in the navigation device 3 is in the latest version based on the version information from the navigation device 3. The center 1 returns the result of determination to the navigation device 3.

The control unit 5 of the navigation device 3 obtains the result of determination from the center 1 via the communication unit 9. The control unit 5 interprets the result of determination. When the map is in the latest version, the control unit 5 disconnects the navigation device 3 from the center 1 since it is not necessary to update the map data.

On the other hand, when the map data is not in the latest version, the control unit 5 transmits a signal requiring map data update information via the communication unit 9 to the center 1.

The center 1 sends update information to update the map data currently held in the navigation device 3 to the latest contents to the navigation device 3. The control unit 5 obtains the update information from the center 1 via the communication unit 9.

Thereafter, the control unit 5 disconnects the navigation device 3 from the center 1, and performs update processing to update the map data held in the navigation device 3 using the update information obtained (supplied) from the center 1.

[Map Data]

On the center 1 side, the CD/DVD and update information to be provided to the navigation device 3 are generated. A database of map original data as a base of the map data stored on the CD/DVD (hereinbelow, referred to as a "map original DB") is generated by another map producing company and delivered to the center 1. Each year, when the map original DB of the year has arrived, the center 1 generates a CD/DVD in the version of the year. That is, the center edits the map original data of the XX year version map original DB to generate an XX year version CD/DVD, then edits the map original data of the XY year version map original DB to generate an XY year version CD/DVD, and edits the map original data of the XZ year version map original DB to generate an XZ year version CD/DVD. Note that upon generation of each year version CD/DVD, shape deformation, thinning of shape point coordinate array and the like are performed on figure data of the map original data. The generated CD/DVD is put on sale through a given route, and loaded on the navigation device 3.

Further, upon receipt of the XY year version map original DB, the center 1 compares the latest XY year version map original DB with the old XX year version map original DB and extracts difference data between the old and new map original data (that is, added, deleted or changed data). Then the center 1 generates update information for the navigation device 3 to update the XX year version map data to the XY year version map data (XX year-XY year update information) from the extracted difference data.

Note that as the unit of extraction of difference data, various units may be employed. For example, when the map data itself is premised on use in small area units with reference to a given longitudinal width (e.g. primary mesh or secondary mesh unit defined by JIS (Japanese Industrial Standards)), the extraction may be made in small area units. That is, when there is even a small change in the small area, the small area itself is regarded as difference data.

Otherwise, it may be arranged such that, when a change is made about only one element, e.g. only a single road, only the "changed part" of the updated road is regarded as difference data.

More particularly, in the above difference data, update content information indicating that the subject is to be deleted is added to respective data included in only the old map original data. By contrast, update content information indicating that the subject is to be added is added to respective data included in only the new map original data.

Further, in the above difference data, regarding data included in both old and new map original data but the contents thereof have been changed, update content information is added to the respective old data. This update content information includes information indicating that the subject is to be changed and new data. Then, the data group with added respective update content information is stored as update information in a given storage medium.

Similarly, upon receipt of XZ year version map original DB, the center 1 compares the latest XZ year version map original DB with the old XY year version map original DB and extracts difference data between the old and new map original data, in the same manner to that described above. Further, the center 1 generates update information for the navigation device 3 to update the XY year version map data to the XZ year version map data (XY year-XZ year update information) from the extracted difference data.

Then, when a request for update information is received from the navigation device 3, the center 1 selects update information to update the map data held in the navigation device 3 to the latest contents based on the version information from the navigation device 3, and transmits the update information.

For example, in a case where the XZ year version map original DB and CD/DVD already exist, when the user having the XX year version CD/DVD is to update the map data to the latest contents (that is, the version information transmitted from the navigation device 3 indicates the XX year version), the center 1 sequentially transmits the XX year-XY year update information and the XY year-XZ year update information to the navigation device 3. The navigation device 3 first updates the map data stored on the XX year version CD/DVD (XX year version map data) to the XY year version map data based on the XX year-XY year update information. Next, the navigation device 3 updates the XY year version map data, obtained from the update, to the XZ year version map data based on the XY year-XZ year update information. Thus the navigation device 3 updates the XX year version map data to the latest map data by this two-step updating.

[Map Data Update Processing in Navigation Device 3]

Next, the outline of the update processing performed by the control unit 5 of the navigation device 3 will be described.

For example, in a case where the map data has never been updated, the map date in the CD/DVD 11 is transferred to the readable/writable storage medium 13.

Then, the update information received from the center 1 is interpreted. When the update information includes data to which update content information indicating "deletion" is added, the data is found from the map data in the storage medium 13 and deleted. Further, when the update information includes data to which update content information indicating "addition" is added, the data is added to the map data in the storage medium 13. Further, when the update information includes data to which update content information indicating "change" is added, the data found from the map data is replaced with the new data. In detail, the data is found from the map data in the storage medium 13 and deleted, and new data included in the update content information indicating "change" is added to the map data in the storage medium 13.

Further, upon second and subsequent map data update, the above processing is performed without transferring the map data in the CD/DVD 11 to the storage medium 13. Note that the stored contents of the CD/DVD 11 itself can be rewritten when the CD/DVD 11 is a rewritable storage medium.

[Shape Correction Processing in Navigation Device 3]

The map data has been thus partially updated, and then the control unit 5 of the navigation device 3 provides the latest information to the user by performing map display processing and route guidance processing using the updated map data in the storage medium 13. In a case where the map data has been simply updated, there is a probability that a shift occurred in a connection portion between updated map data (new map data) and unupdated map data (old map data). As the factors of the shift, the following situations are given:

(1) In a case where the position of a road, existing in both the old and new map data, has been changed, a shift occurs when the old and new map data are mixed. This occurs in the case of partial change of road position by construction.

(2) In a case where the position of a road has not been changed, but data generating standards in the old and new map data are different, a shift may occur when the old and new map data are mixed. As described above, the map original DB is generated by a map producing company and delivered to the center 1. For example, in a case where the accuracy of indication of road position has been improved, a position in the old map data which was shifted from an actual position corresponds with or closer to the actual position in the new map data. Further, in a case where the manufacturers of the old and new map data are different, data generating standards may be different due to difference of accuracy or the like.

When such shift occurs, in a connection portion of map data, an initially-continuous element becomes discontinuous. For example, in FIG. 2A, in areas indicated with arrows A and B, three roads are shifted and discontinuous. The occurrence of shift is not limited to roads but a shift occurs in other map constituent elements in the above situation (2). For example, a shift occurs in a narrow river simply comprised of line segments, a contour line and the like (these elements are formed with polylines), a wide river, a pond, a golf course, a big building and the like (these elements are formed with polygons) indicating a given area.

When map data where these map constituent elements are shifted in a connection portion between the old and new map is displayed, the appearance of the display is very poor. Further, this may cause degradation of map matching accuracy. As described above, the map matching is specifying a current position on a road by using current position information detected using, e.g., GPS, road shape data of map data, and the like. When the above-described shift exists, the road shape supposed to be matched around the map connection portion cannot be specified without difficulty. In such connection portion, a road may match another road. Further, such degradation of the accuracy of map matching and rapid shape change due to such shift may cause execution of inappropriate right/left turn guidance. In this manner, this problem disturbs execution of appropriate navigation function.

Accordingly, in the navigation device 3 of the present embodiment, after the above-described map data partial update, shape correction is performed before execution of the map display, route calculation, and guidance by the control unit 5. As particular timing of shape correction, for example, the shape correction may be performed subsequently to the map data update processing, and the shape-corrected map data may be stored in the storage medium 13. Once the map data is shape-corrected in this manner, appropriate processing using shape-corrected map data can be performed upon execution of map display, route calculation, guidance, and the like using any part of map data. Further, upon reading map data from the storage medium 13 in accordance with execution of map display, route calculation, guidance, and the like, the shape correction may be performed in a real time manner. In this case, the shape-corrected map data is stored in the storage medium 13.

Next, the particular content of the shape correction processing will be described.

Upon shape correction, first, it is determined whether or not an initially-continuous figure is discontinuous in a connection portion between old and new data (hereinbelow, also referred to as an "old-new connection portion"). Here, the old data means data that is not updated through the above-described map data partial update. Further, the old data adjoining the connection portion is naturally adjacent to the new data after the partial update.

Figure 2A:
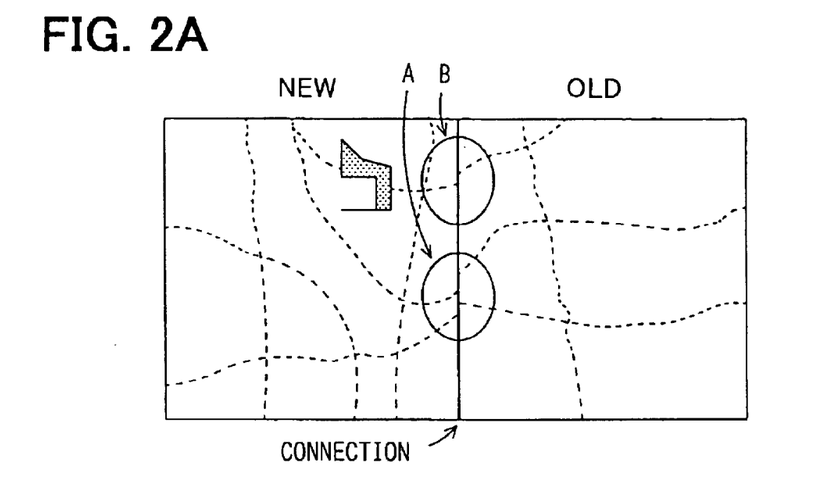
FIGS. 2A and 2B are explanatory views showing discontinuous state and shape-corrected state of roads in connection portions between old and new map.

For example, as shown in FIG. 2A, in the case of map data update by a small rectangular area, four sides of the rectangular area forms an old-new connection portion. Accordingly, it is determined about these four sides whether or not a figure is discontinuous between old and new data. Note that "figure is discontinuous" means that an initially-continuous figure is discontinuous in the old-new connection portion or that an initially-continuous figure has a discontinuous portion in the old-new connection portion. Even in a case where a seemingly discontinuous figure exists, when an initially-continuous counterpart does not exist in the new data, the figure may be actually discontinuous. It is necessary to determine whether or not the old and new data are initially-continuous counterparts.

Figure 3A:
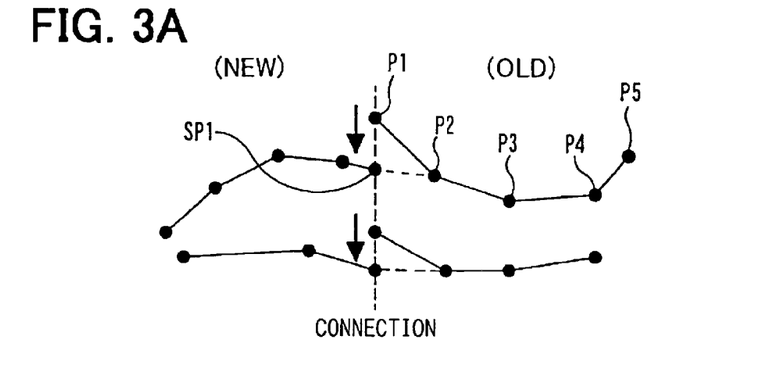
FIGS. 3A to 3C are explanatory views showing particular examples of shape correction.
Figure 3B:
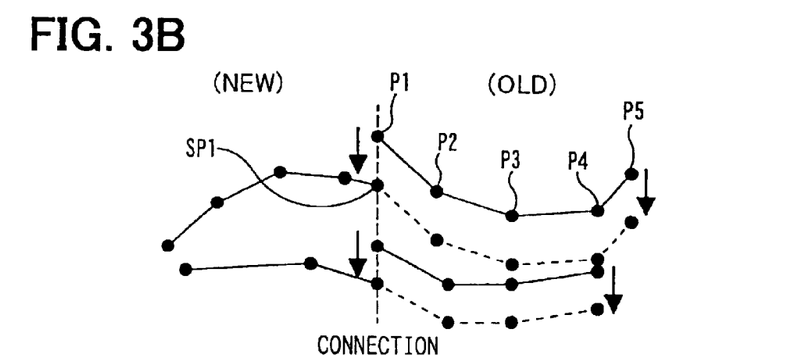
Figure 3C:
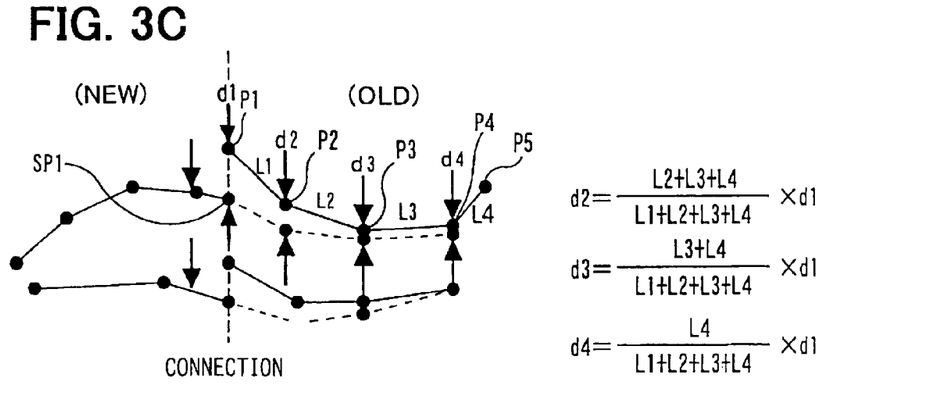

The determination may be made by various methods. For example, the determination can be made based on a distance between shape points in the old-new connection portion. In a case where no other neighbouring shape point exists, as nearest shape points (most probably) are counterparts to be continuous between the old and new data, determination can be made only based on the distance. However, in the case of the area indicated with the arrow A in FIG. 2A, for example, 2 roads are discontinuous. Accordingly, as shown in FIGS. 3A to 3C, when plural mutually-neighbouring plural shape points exist, the determination only based on distance cannot be made without difficulty. In the present embodiment, the determination is made based on, in addition to the distance between shape points in an old-new connection portion, consistency of attribute assigned to the shape points. In the present embodiment, attributes assigned to the roads such as "national road", "prefectural road" and "highway" (or further segmentalized attributes) are used. Based on these attributes, counterparts in the old and new data can be easily specified. In the area indicated with the arrow A in FIG. 2A, when one of the discontinuous roads is a national road and the other road is a prefectural road, they cannot be confused with each other.

In the case of FIG. 2A, as described above, three roads are discontinuous in the area indicated with the arrows A and B. The shape correction is performed on these roads. Note that the shape correction may be performed upon each detection of discontinuous figure in an old-new connection portion, or may be performed after a search for discontinuous figure about one side of the old-new connection portion, or may be performed after all the searches for discontinuous figure about four sides of the old-new connection portion.

As the subjects of shape correction, the following three patterns can be given.

(a) only old data to be corrected (b) only new data to be corrected (c) both old and new data to be corrected In the present embodiment, the case (a) where only old data is corrected will be described for the sake of easiness of understanding.

Particular methods of shape correction are as follows.

(First Correction Method)

Only an old-data side shape point P1, being as an end shape point of an old-data side, is moved to match a new-data side shape point SP1, being as an end shape point of a new-data side (See FIG. 3A). For example, in the case of a road, one link connecting an intersection is often represented with plural shape points and segments therebetween. As shown in FIG. 3A, in a case where one link on the old data side is represented with five shape points P1 to P5, when only the shape point P1 in the old-new connection portion is moved, a segment connecting the point P1 and a shape point P2 is moved (See a broken line portion in FIG. 3A) but other segments are not moved. In this method, the correction processing is simple.

In the first correction method, as shown in FIG. 3A, only the segment connecting the shape point P1 and the adjacent shape point P2 is moved in one link. When the shift of shape point in the connection portion between the old and new data (i.e., the distance between the old-data side shape point P1 and the new-data side shape point SP1) is small, there is substantially no problem, but a problem occurs when the shift is large. In FIG. 3A, the road which has initially turned right is corrected to an almost straight state. In a more extreme case, the initially right-turn road may be corrected to a left-turn road.

In this manner, as countermeasures against the case where an initial figure shape is corrected to a different shape, the following second and third correction methods can be given. In these methods, one or more other shape points connected to a moved shape point via the segments are also moved. Unnaturalness of the entire figure can be thereby reduced.

(Second Correction Method)

Figure 4A:
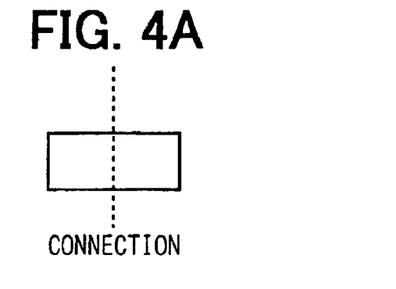
FIGS. 4A to 4G are explanatory views showing arrangement upon shape correction.
Figure 4B:
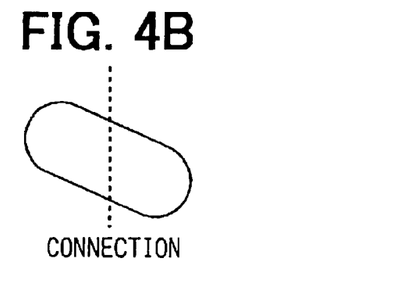
Figure 4C:
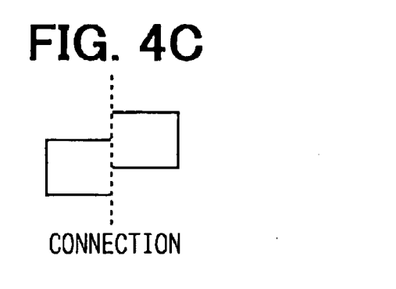
Figure 4D:
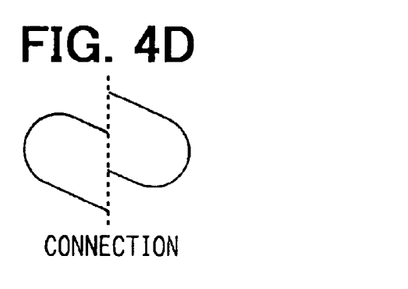

In the second correction method, as shown in FIG. 3B, other shape points P2 to P5 are moved in parallel by the same amount as that of movement of the shape point P1 in the old-new connection portion. In this case, the original figure is entirely moved in parallel. In the case of polygon figure representing a building as shown in FIG. 4A and in the case of figure such as a pond or golf course as shown in FIG. 4B, the parallel movement is effective.

(Third Correction Method)

In the third correction method, as shown in FIG. 3C, among the old-data side shape points P1 to P5, the farthest shape point from the shape point P1 in the old-new connection portion (the shape point P5 in this case) is not moved as a reference. Other shape points P1 to P4 are moved such that the amount of movement is increased as the distance from the farthest shape point P5 is increased.

More particularly, as the amount of movement is proportional to the distance from the farthest shape point P5, the movement will be described with reference to FIG. 3C.

First, regarding the shape point P1 in the old-new connection portion which is brought to match the new-data side shape point SP1, the distance between these shape points (P1, SP1) is d1. Further, the length of a segment between the shape points P1 and P2 is L1; that of a segment between the shape points P2 and P3 is L2; that of a segment between the shape points P3 and P4 is L3; and that of a segment between the shape points P4 and P5 is L4. Assuming that the distances of movement of the shape points P2, P3, and P4 are d2, d3, and d4, the distances are represented as follows using the distance d1:

$$d2 = \{(L2+L3+L4)/(L1+L2+L3+L4)\} \times d1$$

$$d3 = \{(L3+L4)/(L1+L2+L3+L4)\} \times d1$$

$$d4 = \{L4/(L1+L2+L3+L4)\} \times d1$$

That is, in this case, L1+L2+L3+L4 is the length of one link. As the distance of shift of the shape point P1 which is one-link away from the farthest shape point P5 is d1, the above expressions hold with reference to the distance d1.

Figure 2B:
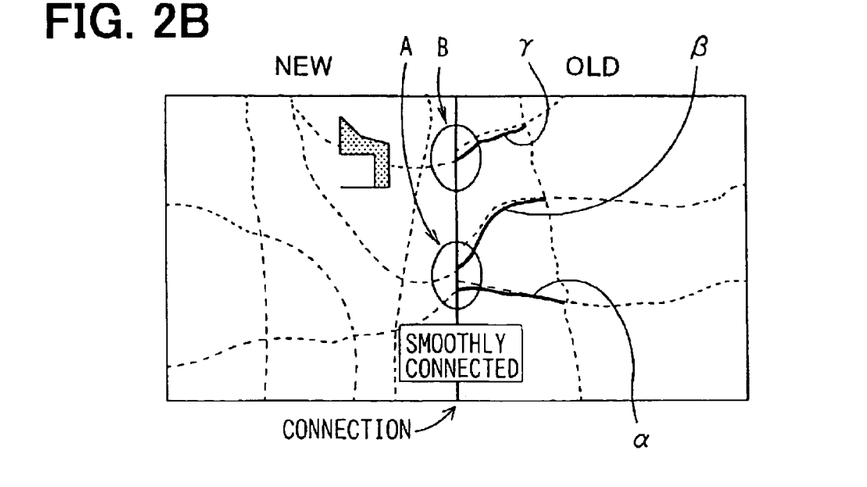

In this manner, as the farthest shape point P5 is not moved, the third correction method is effective in the case of non-surrounded and highly-continuous figure such as a road or river. For example, in a case where a "shift" in a road is shape-corrected by parallel movement of the entire figure according to the above-described second correction method, consistency cannot be obtained unless all the connected shape points are moved. This method is unpractical in this case. That is, in a case where the shape point P5 in FIG. 3B corresponds to an intersection, unless another links connected to the intersection is also moved, the link is broken in the intersection. On the other hand, in the third correction method, as shown in FIG. 3C, the farthest shape point P5 is not moved. Accordingly, even when the farthest shape point P5 is positioned at a link end and corresponds to an intersection, another link connected to the intersection is not particularly corrected. In this case, only one link of the shape P5 is shape-corrected from the shape point P1 in the old-new connection portion. This method is preferable from the point of reduction of processing load. In FIG. 2B, the three links α, β, γ are respectively shape-corrected using the third correction method. As it is understood from the correction, in FIG. 2B, ends of the respective links α, β, γ are smoothly connected with the roads on the new data side in the areas indicated with the arrows A and B. On the other hand, as the other ends of the respective links α, β, γ are not moved, other links connected to these links are not moved.

Further, in the second correction method, as an original figure is entirely moved in parallel, the entire shape of the figure is not changed at all. On the other hand, in the third correction method, the shape of the original figure is somewhat changed, however, as the entire figure is slightly deformed, the change is different from the case of the first correction method in which a changed part of a figure becomes extremely different from an initial shape. For example, as it is understood from FIG. 3C, in the case of a road, only the curvature is somewhat flatten (or somewhat steepened). In the present embodiment, shape correction is made on only the old data side, however, when both old and new data are shape-corrected, the degree of deformation from initial figure shape can be more mitigated.

Figure 4E:
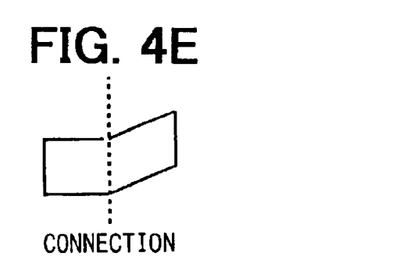
Figure 4F:
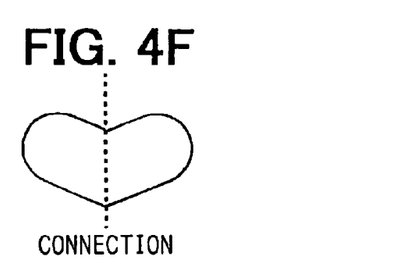

As described above, the third correction method is effective mainly in application to roads and the like. On the other hand, when the third correction method is applied to a polygon figure representing a building as shown in FIG. 4A or to a round figure such as a pond or a golf course as shown in FIG. 4B, to which the above-described second correction method is effectively applicable, inappropriate contents are resulted from the shape correction. That is, as shown in FIG. 4E, the initially rectangular figure representing a building may become an irregular shaped figure. Further, as shown in FIG. 4F, the initially elliptic figure representing a pond may become a heart-shaped figure. Accordingly, the parallel movement by the above-described second correction method is appropriate to these figures. As it is understood from these cases, it is preferable that the respective correction methods are not fixedly used but selected in accordance with the subject of correction.

The selection of correction method may be made as follows:

(i) First, when the shift between the old-data side shape point P1 and the new-data side shape point SP1 (distance d1 in FIG. 3C) is less than a given value, the first correction method as shown in FIG. 3A is used.

(ii) On the other hand, in a case where the shift between the shape points P1 and SP1 in the old-new connection portion (distance d1) is equal to or greater than the given value, when the subject of correction is a surrounded figure (polygon figure) representing a building, a pond, a golf course, or the like, the second correction method is used. When the subject of correction is not a surrounded figure but a highly-continuous figure (polyline figure), the third correction method is used.

In this manner, appropriate correction using a correction method appropriate to the characteristic of each figure can be performed.

As described above, in the navigation device 3 of the present embodiment, in a case where a shift is detected between shape points P1 and SP1 in an old-new data connection portion, the shift can be solved. This restricts degradation of appearance in map display, further, restricts degradation of accuracy in map matching, and further, restricts inappropriate guidance in right/left turn guidance.

The embodiment of the present invention has been described as above, however, the present invention is applicable to various forms. Hereinbelow, other embodiments will be described.

(1) In the above embodiment, three types of correction methods are used, however, other correction method may be used. For example, as a correction method to obtain a result close to that by the third correction method, shape correction may be performed by rotating a shape point group about the above-described farthest shape point P5 as a rotational center while relative positional relation in the shape point group (P1 to P5) is maintained. At this time, there is a probability that the shape point P1 in the old-new connection portion does not match the new-data side shape point SP1 only by simple rotation. In such case, parallel movement may be added to the rotation for fine control, in accordance with necessity. That is, only the segment L1 between the shape points P1 and P2 is lengthened or shortened such that the old-data side shape point P1 matches the new-data side shape point SP1.

(2) In the above embodiment, it is determined whether or not an initially-continuous figure is discontinuous in an old-new connection portion. The determination is made based on, in addition to the distance between the shape points in the old-new connection portion, consistency of attributes assigned to the shape points, such as national road, prefectural road and highway in the case of road. However, in a case where plural roads having the same attribute are positioned in parallel at a constant interval, appropriate determination cannot be made without difficulty. For example, in FIG. 4G, three roads having the same attribute (e.g., national roads) run in parallel at approximately constant intervals. Further, regarding the distances between shape points in the old-new connection portion, one road on the old data side is away from two roads on the new data side respectively by the same distance. In this situation, an initially-continuous counterpart for the road on the old data side cannot be discriminated.

Figure 4G:
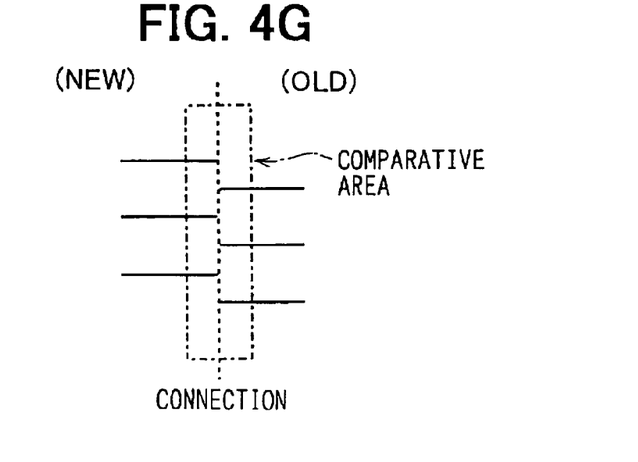

As a countermeasure against this case, initially-continuous counterparts in the old and new data can be specified by examining correlation between areas within given ranges. That is, as shown in FIG. 4G, given areas on the new data side and the old data side including the old-new connection portion are extracted as comparative areas. Then shape point coordinate array data forming figure data included in the comparative areas are respectively converted to raster image data representing figure shapes. The figure shapes in the comparative areas are compared with each other by using these raster image data. Initially-continuous counterparts can be thereby specified. For example, the shape comparison is made while the new-data side comparative area is fixed and the old-data side comparative area is moved in parallel along the old-new connection portion. In FIG. 4G, the old-data side comparative area is moved upward, then the three roads become continuous, thus counterparts of the three roads can be specified.

(3) In the above embodiment, the center 1 obtains the latest map original data from the map producing company as a map provider and generates the update information. However, the center 1 itself may generate the latest map original data and the update information. Further, the CD/DVD (storage medium holding map data) 11 may be a PC card, an IC card, or the like.

(4) In the above embodiment, the in-vehicle navigation device 3 has been described, however, the present invention is not limited to the in-vehicle navigation device, but is applicable to general and communicable electronic devices used at home or outside.

(5) Further, the present invention is not limited to a system where update information is supplied to an electronic device by communication, but is also applicable to a system where the information is supplied via various storage media such as a CD-ROM, a DVD-ROM, an FD, a PC card, and an IC card.

(6) A program for realizing the above update system can be distributed by being stored in a storage medium including a magnetic disk such as a flexible disk, a magnetic optical disk, a compact disk, or the like. The program can be loaded from the storage medium into a computer when needed. Furthermore, the program can be distributed via a communications network to be loaded.

It will be obvious to those skilled in the art that various changes may be made in the above-described embodiments of the present invention. However, the scope of the present invention should be determined by the following claims.

What is claimed is:

1. An electronic device that includes:
   a storage unit for storing map data including figure data formed of at least shape point coordinate array data;
   an execution unit for executing given processing based on the map data stored in the storage unit;
   a reception unit for receiving update information supplied from an outside, wherein the update information is for updating the map data stored in the storage unit, wherein the update information includes specifying information for specifying updated figure data that is to be updated in the map data and new figure data, the new figure data which the updated figure data is updated with and is formed of at least shape point coordinate array data, and wherein the specifying information and the new figure data are correlated with each other; and
   an update unit for, when the update information is received, specifying the updated figure data from the map data in the storage unit and updating the specified updated figure data with the new figure data,
   the electronic device comprising:
   a determination unit for determining whether an initially-continuous figure has a discontinuous portion in a connection portion between the new figure data and an adjacent figure data, wherein, after updating by the update unit, the adjacent figure data is not updated in the map data stored in the storage unit and is adjacent to the new figure data; and a shape correction unit for moving, when the initially-continuous figure is determined to have the discontinuous portion in the connection portion, at least one of an end shape point of the new figure data and an end shape point of the adjacent figure data, wherein each of the two end shape points is included in a plurality of shape points and corresponds to the discontinuous portion, so as to bring the two end shape points into correspondence, wherein a shape-corrected map data that is shape-corrected by the shape correction unit is stored in the storage unit or both of determining by the determination unit and moving by the shape correction unit are executed when the map data is read from the storage unit in accordance with executing the given processing.

2. The electronic device of claim 1, wherein, when the shape correction unit moves at least one of the two end shape points, the shape correction unit also moves at least one of shape points linked to the moved end shape point via at least one of segments.

3. The electronic device of claim 2, wherein, when the shape correction unit moves at least one of the shape points linked to the moved end shape point, the shape correction unit moves at least one of the shape points in parallel by a same amount as that of the moved end shape point.

4. The electronic device of claim 2, wherein, when a group of shape points, wherein the group of shape points is a subset of the plurality of shape points, is linked via a group of segments with the moved end shape point, the shape correction unit does not move a farthest shape point of the group of shape points as a reference while the shape correction unit moves the moved end shape point and remaining shape points, wherein the remaining shape points are shape points other than the farthest shape point of the group of shape points, based on respective distances from the farthest shape point to the moved end shape point and the remaining shape points, wherein amount of moving of each of the moved end shape point and the remaining shape points is increased with increasing distance from the farthest shape point.

5. The electronic device according to claim 4, wherein the shape correction unit moves each of the moved end shape point and the remaining shape points by an amount of moving proportional to each of the distances from the farthest shape point.

6. The electronic device of claim 1, wherein the determination unit determines the initially-continuous figure has the discontinuous portion in the connection portion based on a distance between the two end shape points of the new figure data and the adjacent figure data.

7. The electronic device of claim 6, wherein the determination unit determines the initially-continuous figure has the discontinuous portion in the connection portion based on consistency between attributes assigned to the end shape points of the new figure data and the adjacent figure data in addition to the distance between the two end shape points of the new figure data and the adjacent figure data.

8. The electronic device of claim 1, wherein the determination unit determines the initially-continuous figure has the discontinuous portion in the connection portion by converting shape point coordinate array data forming figure data included within a given area of the new figure data including the connection portion and shape point coordinate array data forming figure data included within a certain area of the adjacent figure data including the connection portion, respectively into raster image data representing figure shapes, and executing figure shape comparison using the raster image data.

9. A computer program product that includes a computer usable medium and is used in an electronic device that includes:

a storage unit for storing map data including figure data formed of at least shape point coordinate array data;

an execution unit for executing given processing based on the map data stored in the storage unit;

a reception unit for receiving update information supplied from an outside, wherein the update information is for updating the map data stored in the storage unit, wherein the update information includes specifying information for specifying updated figure data that is to be updated in the map data and new figure data, the new figure data which the updated figure data is updated with and is formed of at least shape point coordinate array data, and wherein the specifying information and the new figure data are correlated with each other; and an update unit for, when the update information is received, specifying the updated figure data from the map data in the storage unit and updating the specified updated figure data with the new figure data, the computer program product comprising:

a first instruction group for determining whether an initially-continuous figure has a discontinuous portion in a connection portion between the new figure data and an adjacent figure data that is, after updating by the update unit, not updated in the map data stored in the storage unit and is adjacent to the new figure data; and a second instruction group for moving, when the initially-continuous figure is determined to have the discontinuous portion in the connection portion, at least one of an end shape point of the new figure data and an end shape point of the adjacent figure data, wherein each of the two end shape points is included in a plurality of shape points and corresponds to the discontinuous portion, so as to bring the two end shape points into correspondence, wherein a shape-corrected map data that is shape-corrected by the second instruction group is stored in the storage unit or both of determining by the first instruction group and moving by the second instruction group are executed when the map data is read from the storage unit in accordance with executing the given processing.

10. A map update method used in an electronic device that includes:

a storage unit for storing map data including figure data formed of at least shape point coordinate array data;

an execution unit for executing given processing based on the map data stored in the storage unit;

a reception unit for receiving update information supplied from an outside, wherein the update information is for updating the map data stored in the storage unit, wherein the update information includes specifying information for specifying updated figure data that is to be updated in the map data and new figure data, the new figure data which the updated figure data is updated with and is formed of at least shape point coordinate array data, and wherein the specifying information and the new figure data are correlated with each other; and an update unit for, when the update information is received, specifying the updated figure data from the map data in the storage unit and updating the specified updated figure data with the new figure data, the map update method comprising:

a first step of determining whether an initially-continuous figure has a discontinuous portion in a connection portion between the new figure data and an adjacent figure data that is, after updating by the update unit, not updated in the map data stored in the storage unit and is adjacent to the new figure data; and a second step of moving, when the initially-continuous figure is determined to have the discontinuous portion in the connection portion, at least one of an end shape point of the new figure data and an end shape point of the adjacent figure data, wherein each of the two end shape points is included in a plurality of shape points and corresponds to the discontinuous portion, so as to bring the two end shape points into correspondence, wherein a shape-corrected map data that is shape-corrected by the second step is stored in the storage unit or both of the first and second steps are executed when the map data is read from the storage unit in accordance with executing the given processing.

* * * * *